United States Patent
Sleeper

(10) Patent No.: US 6,401,074 B1
(45) Date of Patent: Jun. 4, 2002

(54) RETAIL TRANSACTION PROMOTION SYSTEM

(75) Inventor: Dean A. Sleeper, Seattle, WA (US)

(73) Assignee: Access, Seattle, WA (US)

( * ) Notice: Subject to any disclaimer, the term of this patent is extended or adjusted under 35 U.S.C. 154(b) by 0 days.

(21) Appl. No.: 09/096,548

(22) Filed: Jun. 12, 1998

(51) Int. Cl.[7] .............................................. G06F 17/60
(52) U.S. Cl. ........................... 705/14; 705/16; 705/21; 235/383
(58) Field of Search ........................... 705/14, 26, 10, 705/16, 21; 235/383; 186/59

(56) References Cited

U.S. PATENT DOCUMENTS

| | | | |
|---|---|---|---|
| 5,687,322 A | * 11/1997 | Deaton et al. | 705/14 |
| 5,798,931 A | * 8/1998 | Kaehler | 700/231 |
| 5,857,175 A | * 1/1999 | Day et al. | 705/14 |
| 5,924,078 A | * 7/1999 | Naftzger | 705/16 |
| 5,932,869 A | * 8/1999 | Gottlich et al. | 235/493 |
| 5,992,888 A | * 11/1999 | North et al. | 283/56 |
| 6,292,786 B1 | * 9/2001 | Deaton et al. | 705/14 |

FOREIGN PATENT DOCUMENTS

| | | | |
|---|---|---|---|
| WO | WO931942 | * | 3/1993 |
| WO | WO93/16443 | * | 8/1993 |
| WO | WO97/05556 | * | 2/1997 |

OTHER PUBLICATIONS

Zimmerman "Displays that register"; Jan. 1995; Supermarket News; vol. 45, No. 3, ISSN: 0039–5803.*
Space–Saving Terminal Marks NCR's First Foray into Kiosks, RTnews, Aug. 1998.

* cited by examiner

Primary Examiner—Tariq R. Hafiz
Assistant Examiner—Romain Jeanty
(74) Attorney, Agent, or Firm—Hendricks & Lewis

(57) ABSTRACT

An augmented point of sale system that displays, and that may broadcast, during a retail transaction, promotional information to a customer selected on the basis of the context of the transaction. An existing front-end POS system is augmented with an auxiliary display device intended for viewing by a customer while the customer interacts with the sales clerk in order to conduct a retail transaction. Software components are added to the point of sale system in order to generate messages corresponding to events that occur during the transaction and to, in turn, translate those events into display images displayed on the auxiliary display device. The auxiliary display device can display text, broadcast music or audio information, show video clips and other real-time dynamic media, and display static images.

11 Claims, 22 Drawing Sheets

| ACME PRICE BUSTERS<br>YOU'LL PAY LESS AND LIVE BETTER | | | |
|---|---|---|---|
| ICE CREAM 1/2 GALLON | 4 | | 23.16 |
| CHEEZE TWISTS-LARGER SIZE | 1 | | 6.85 |
| CHOCOLATE TRUFFLES | 2 | | 12.86 |
| LARD | 1 | | 3.19 |
| VEGETABLE OIL | 2 | | 4.96 |
| DRANOL | 1 | T | 4.41 |
| AA BATTERIES-4 PACK | 1 | | 3.44 |
| POPSICLES-CREAMY FUDGE | 7 | | 24.15 |
| NEWSPAPER | 1 | T | 1.00 |
| TABLOID | 1 | T | 1.25 |
| FLYING SAUCER NEWS | 1 | T | 3.88 |
| MOUSE TRAPS-4 PACK | 2 | T | 3.80 |
| CHOCOLATE BAR-BIG SIZE | 1 | | 2.99 |
| ALUMINUM FOIL | 1 | T | 1.99 |
| | | | |
| TOTAL TAXABLE | | | 16.33 |
| TAX | | | 1.31 |
| TOTAL NON TAXABLE | | | 87.15 |
| | | | |
| TOTAL | | | 104.79 |

6/09/98   19:05

JANE DOE,
BY USING YOUR ACME
CHARGE CARD, YOU HAVE RECEIVED
AN EXTRA 432 BONUS POINTS ← 1302

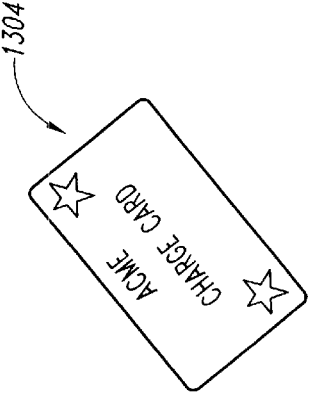
← 1304

*Fig. 13*

| ACME PRICE BUSTERS YOU'LL PAY LESS AND LIVE BETTER | | | |
|---|---|---|---|
| ICE CREAM 1/2 GALLON | 4 | | 23.16 |
| CHEEZE TWISTS-LARGER SIZE | 1 | | 6.85 |
| CHOCOLATE TRUFFLES | 2 | | 12.86 |
| LARD | 1 | | 3.19 |
| VEGETABLE OIL | 2 | | 4.96 |
| DRANOL | 1 | T | 4.41 |
| AA BATTERIES-4 PACK | 1 | | 3.44 |
| POPSICLES-CREAMY FUDGE | 7 | | 24.15 |
| NEWSPAPER | 1 | T | 1.00 |
| TABLOID | 1 | T | 1.25 |
| FLYING SAUCER NEWS | 1 | T | 3.88 |
| MOUSE TRAPS-4 PACK | 2 | T | 3.80 |
| CHOCOLATE BAR-BIG SIZE | 1 | | 2.99 |
| ALUMINUM FOIL | 1 | T | 1.99 |
| | | | |
| TOTAL TAXABLE | | | 16.33 |
| TAX | | | 1.31 |
| TOTAL NON TAXABLE | | | 87.15 |
| | | | |
| TOTAL | | | 104.79 |

6/09/98  19:05

YOUR NEW BONUS POINT TOTAL IS 1876. ~1402
WHEN YOUR BONUS POINT TOTAL REACHES 3000, YOU WILL QUALIFY TO RECEIVE: ~1404

A TRIP TO HAWAII FOR 2
2 10 GALLON ACME ICE CREAMS EACH ~1406
MONTH FOR A YEAR
A NEW TV

BY TH WAY, ACME ALSO SELLS
HEALTHFUL FRUITS AND VEGETABLES ~1408

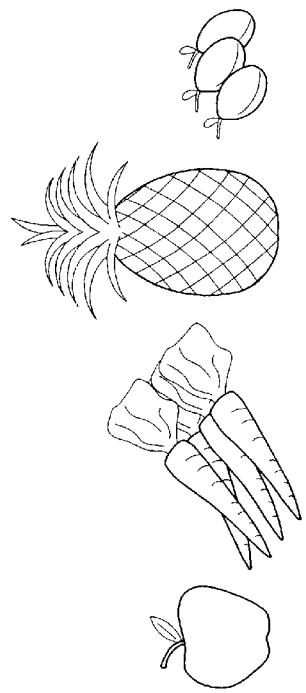

Fig. 14

```
<?xml version='1.0'?>
<PROMOS GENERATOR INSTRUCTIONS>

<GUID>()<GUID>

<TIMESTAMP>
<DATE>01012000</DATE>
<TIME>01010101</TIME>
</TIMESTAMP>
                              ⎯2104           ⎯2110
2102⎯ <BANNER>Transaction Presentation Banner</BANNER>
      <VREGISTERTAPE>Virtual Register Tape<VREGISTERTAPE>

<PRESENTATION NAME>Free Prints From Slides</PRESENTATION NAME>
<PRESENTATION TYPE>Transaction</PRESENTATION TYPE>

<PRESENTATION TRIGGER>
      <TRIGGER MAX>1</TRIGGER MAX>
      <TRIGGER PRIORITY>4</TRIGGER PRIORITY>
2112⎯ <SCRIPT TYPE>VBScript</SCRIPT TYPE>
2106⎯ <SCRIPT>IF UPC="1234567890"PLAY PROPOSITION
2108⎯ "http://www.server.com/freeprnt.swf"</SCRIPT> AND CALL PROGRAM
      "http://www.server.com/dSIGN-fTRANSACT -o{PRSENTATION
      NAME}.HTM"</SCRIPT>
      </PRESENTATION TRIGGER>

<PROPOSITION VALUE>
<PROPVAL INIT>1</PROPVAL INIT>
<PROPVAL MAX>9</PROPVAL MAX>
</PROPOSITION VALUE>

<PROPOSITION INCREMENTATION>
<INCREMENTATION VALUE>1</INCREMENTATION VALUE>
<PROPINC TRIGGER>TransactionTotal</PROPINC TRIGGER>
<PROPINC TRIGGER VALUE>10.00</PROPINC TRIGGER VALUE>
<PROPINC PATTERN>smooth</PROPINC TRIGGER>
</PROPOSITION INCREMENTATION>

<PROPOSITION END>
<PROPEND PRESENTATION>Free Prints From Slides Complete</PROPEND
PRESENTATION>
<THANK YOU>http://www.server.com/thankyou.gif</THANK YOU>
</PROPOSITION END>
```

*Fig. 21A*

```
<LOYALTY VALUE>
<LOYALTYVAL INIT>CUSTOMER BALANCE</LOYALTYVAL INIT>
<LOYALTYVAL MIN>0</LOYALTYVAL MIN>
<LOYALTYVAL MAX>50</LOYALTYVAL MAX>
<LOYALTY VALUE>

<LOYALTY INCREMENTATION>
<INCREMENTATION VALUE>Price</INCREMENTATION VALUE>
<LOYALTYINC TRIGGER>AddItem</LOYALTYINC TRIGGER>
<LOYALTYINC TRIGGER VALUE>0.00</LOYALTYINC TRIGGER VALUE>
<LOYALTYINC PATTERN>DECREMENT</LOYALTYINC TRIGGER>
</LOYALTY INCREMENTATION>

<LOYALTY STATE RESTORE>
<LOYSTRES VALUE>Customer Balance</LOYSTRES VALUE>
</LOYALTY STATE RESTORE>

<LOYALTY END>
<LOYALTY END PRESENTATION>Loyalty Threshold Passed</LOYALTYEND PRESENTATION>
</LOYALTY END>

<PRESENTATION END>
<PRESENTEND DELAY>10000<PRESENTEND DELAY>
<PRESENTEND CALL>10000<PRESENTEND CALL>
</PRESENTATION END>

</PROMOS GENERATOR INSTRUCTIONS>
```

*Fig. 21B*

RETAIL TRANSACTION PROMOTION SYSTEM

TECHNICAL FIELD

The present invention relates to point of sales systems for conducting retail transactions and, in particular, to a method and system for displaying and/or broadcasting promotional and informational messages to a customer during a retail transaction.

BACKGROUND OF THE INVENTION

Point of sale ("POS") systems have been commonly implemented with proprietary cash register machines linked through a communications network to one or more backroom servers. Recent advances in computer hardware, manufacturing processes, operating systems, and software design methodologies have made possible new generations of POS systems based on personal computer ("PC") technologies. Both traditional POS systems and new generation PC-based POS systems provide both valuable information collection services and basic facilitation of retail transactions. However, POS systems currently provide relatively minimal feedback to the customer, generally a sales receipt and possibly display representation of a sales transaction, as discussed above. In some currently available POS systems, various advertisements and consumer information may be printed on the sales receipt or displayed on a auxiliary monitor or LED display. However, these currently available POS systems lack the capability of complex scripted tailoring of promotional information or advertisements to a particular customer within the context of the current retail transaction. Instead, advertisements and information are printed or displayed identically to each customer, on a random basis, or on the basis of simple item code matching. It would be desirable, for example, for a retail merchant to designate, within the POS system, particular promotional information tailored to particular customers based on the specific details of a retail transaction and on previously collected and processed information, including the loyalty information discussed above. Thus, purchase of a particular item by a particular customer might trigger an evaluation based on multiple variables within the transaction that leads to a special message or advertisement, including, for example, a discount or bonus computed from the evaluation. The need has therefore been recognized by retail merchants for POS systems with real-time, context driven promotional capabilities.

SUMMARY OF THE INVENTION

The present invention provides an augmented POS system that includes capabilities for real-time displaying and broadcasting of commercial information within the context of a retail transaction. Each front-end POS system is augmented with an auxiliary display or combined display and audio broadcast device for presenting promotional information to a customer during the course of a retail transaction. The auxiliary display device displays and may broadcast output of a web browser. A software messenger component resides within the front-end POS system in order to accept events from a POS system that are recognized by the POS system during the retail transaction. The messenger component translates the events into generalized messages that are queued to a message queuing component. The generalized messages are dequeued from the message queuing component by a generating component that generates web pages. The generated web pages are made available to a web server that provides web pages to the web browser for display on the auxiliary display device included in the front-end POS system. The augmented POS system can thus, in real-time, display web pages via the web browser generated in response to events that occur during the retail transaction. The net result is the real-time display to a customer of specific information tailored to that customer in the context of the retail transaction.

BRIEF DESCRIPTION OF THE DRAWINGS

FIGS. 7–14 illustrate the retail transaction of FIG. 2 conducted on a promotional retailing system.

FIGS. 21A–21B illustrate an example script run by the promotional retailing system generator.

DETAILED DESCRIPTION OF THE INVENTION

The present invention provides an augmented POS system, or promotional retailing system ("PRS"), that provides real-time display, and that may also provide audio broadcast, of promotional information to a customer during a retail transaction. A number of different components are embedded within a POS system in order to produce the PRS. A messenger component is embedded within the front-end POS system in order to collect the events generated by the POS system, translate those events into generalized messages, and queue the generalized messages to a message queuing system, generally provided by a standard operating system within the front-end POS system or within one or more backroom servers. A generator component runs either on the POS system, a backroom server, or perhaps an additional computer, to dequeue the generalized messages from the queuing system, produce web pages corresponding to the generalized messages, and provide those web pages to a web server. A specialized web browser component displays and perhaps broadcasts the web pages on an auxiliary display and broadcast device to a retail customer. This system thus provides real-time promotional information to the retail customer during the course of a retail transaction that can be specifically tailored to the customer within the context of the retail transaction.

Figure 1:
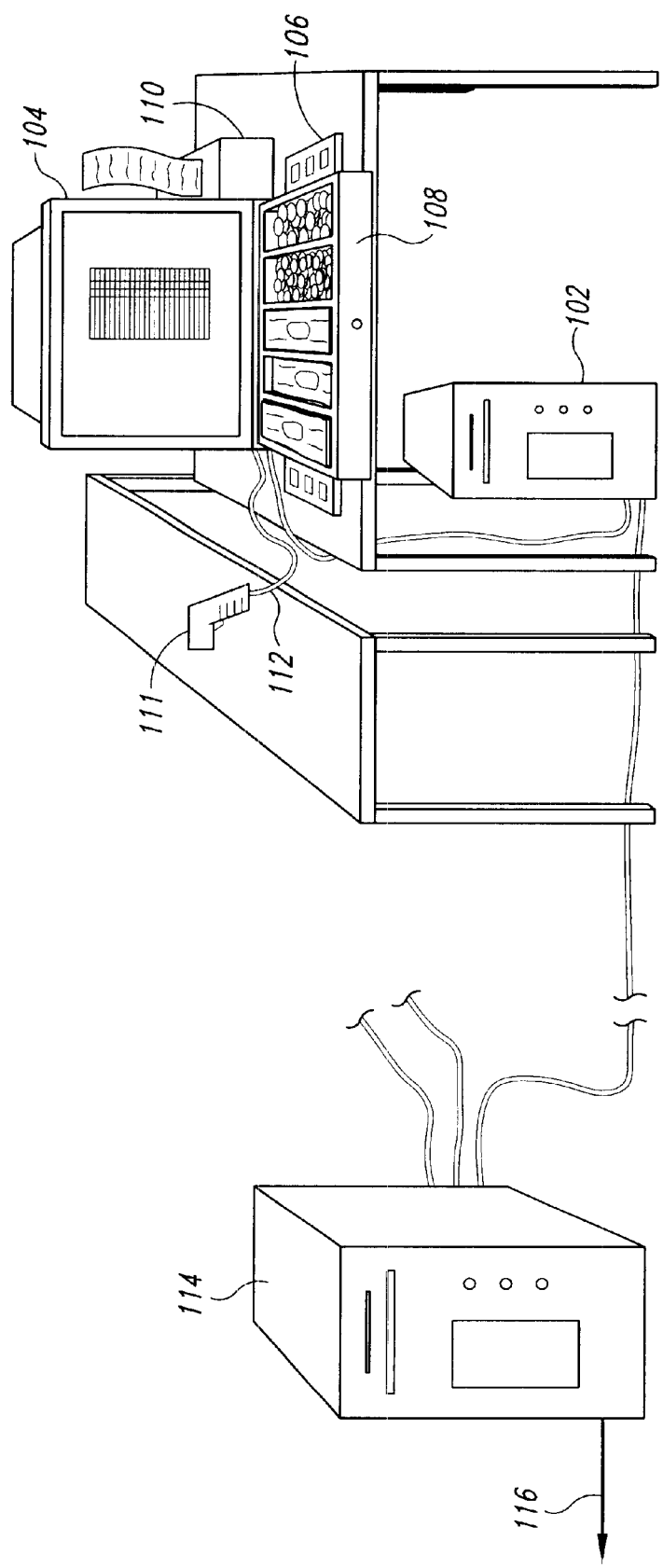
FIG. 1 illustrates a newer-generation POS system.

FIG. 1 illustrates a newer-generation POS system. The front-end portion of the POS system comprises a PC 102 or similar computer system that includes a display monitor 104 and one or more input devices, such as a keyboard 106. The front-end POS system also includes a cash drawer component 108 similar to the cash drawer of a cash register machine. The cash drawer is activated by a front-end POS application program running on the PC 102. The front-end POS system further includes a printing device 110 that prints out a sales receipt at the end of a transaction. The front-end POS system is intended for use at each check out counter 111 or similar retail transaction station within a retail sales establishment.

The front-end POS system essentially serves the purpose of a traditional cash register machine. A sales clerk scans items to be purchased using an optical scanner 112 or, alternatively, the keyboard 106 or another input device. The front-end application program running on the PC 102 correlates scanned product identifiers, such as barcodes, with entries within a file or database that describes each product. Such entries may include a text description of the product, the price of one unit in which the product is sold, information as to whether the product should be taxed upon sale, and additional information useful for ordering, inventory control, and other operational and management tasks conducted either by the retail establishment or by a computer system located in a remote home office. As the items are scanned, a list of items is displayed on the display monitor 104 along with prices and running totals, or, in other words, cumulative charges for the transaction. The front-end POS system is additionally linked by a computer network to one or more backroom server computers 114. The backroom server computer is commonly linked via a telecommunications link 116 or a wide area network ("WAN") to computer systems that reside in a remote home office or a remote regional office. The backroom server computer 114 contains the management and control software that collects transaction information from front-end POS systems, processes the collected information, and both carries out management and maintenance tasks for the retail establishment as well as sending certain of the collected and processed information via the telecommunications link 116 to a remote computer system. The backroom server often, for example, conducts inventory control for the retail establishment, automated accounting, and, in addition, conducts statistical analysis or dynamic analysis of the flow of retail transactions. A remote computer system in a remote office may conduct similar management and maintenance tasks on a company-wide basis, including ordering and arranging for distribution of products to replenish stocks in the retail establishments.

Figure 2:
FIG. 2 illustrates an example sales receipt and/or monitor display corresponding to an example retail transaction.

FIG. 2 illustrates an example sales receipt that may, in addition, be displayed on a monitor, corresponding to an example retail transaction. The sales receipt may include a header 202 specific to the retail establishment, a date 204 and time 206 of the retail transaction represented by the receipt, and a graphic image, promotional message, or other types of advertising 208. Traditionally, the sales receipt includes an itemized list of the items purchased during the transaction 210 with columns that commonly include a text description of each item purchased 212, the quantity of each item purchased 214, an indication of whether the purchase of the item is taxable 216, and a price corresponding to the quantity of items purchased multiplied by the price of the basic unit of sale of the item 218. In addition, the sales receipt commonly includes various subtotals and a total price for the retail transaction 222. A printed sales receipt may differ in format and content from the display produced by the display monitor of the front-end POS system (104 in FIG. 1).

Figure 3:
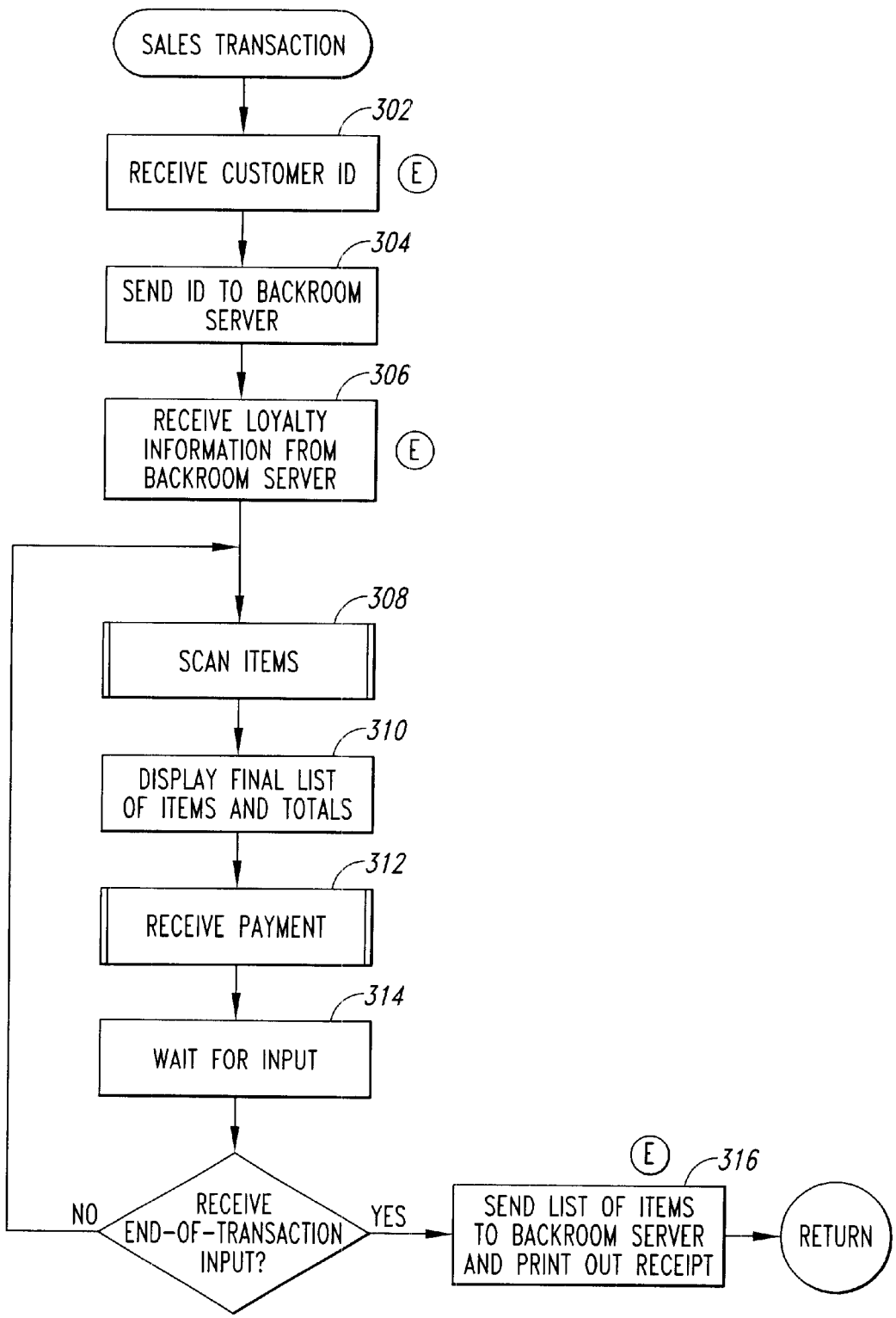
FIG. 3 is a high-level flow control diagram for the program "Sales Transaction" that represents a front-end POS application program.
Figure 4:
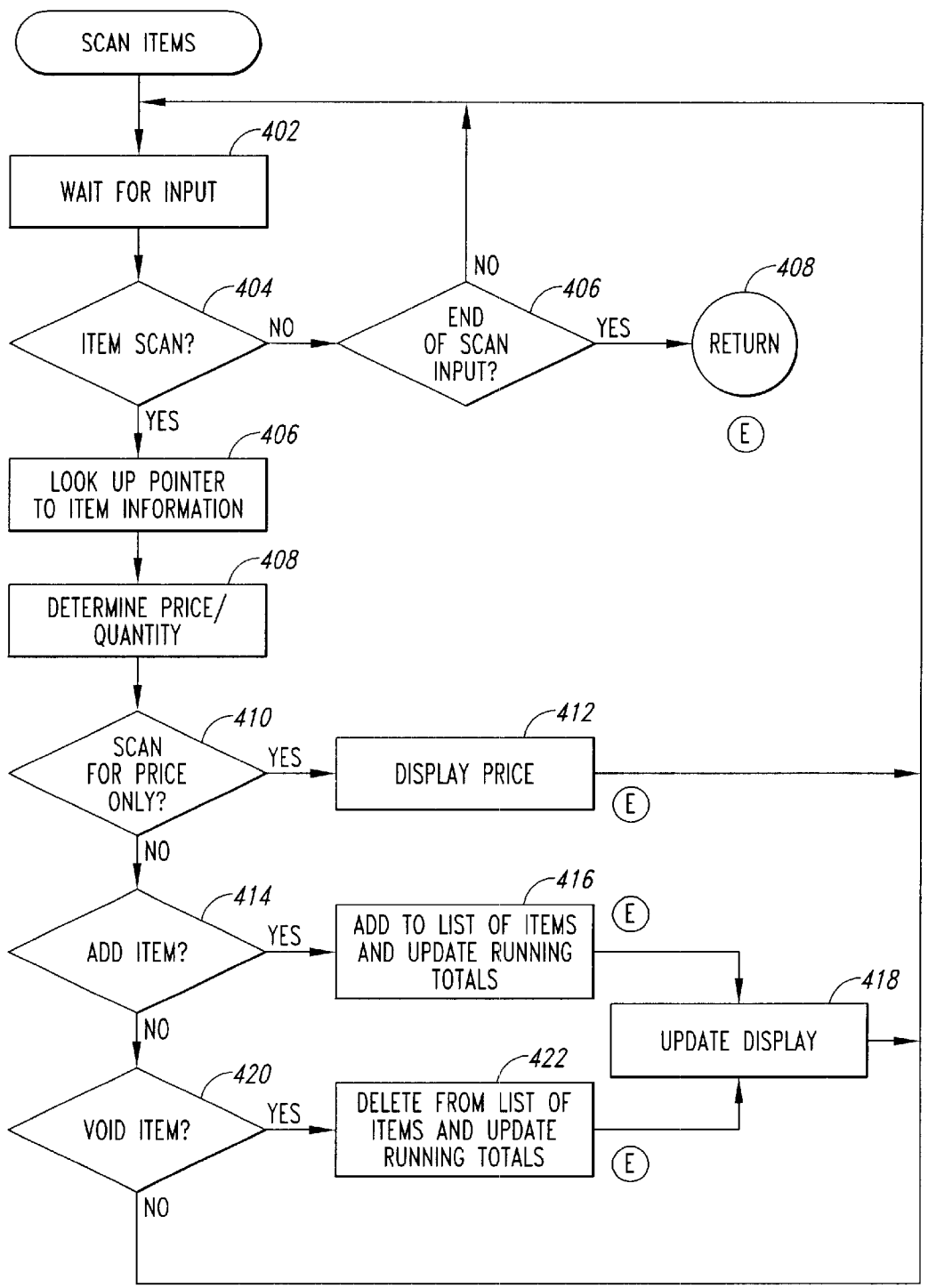
FIG. 4 is a flow control diagram for the routine "Scan Items."
Figure 5:
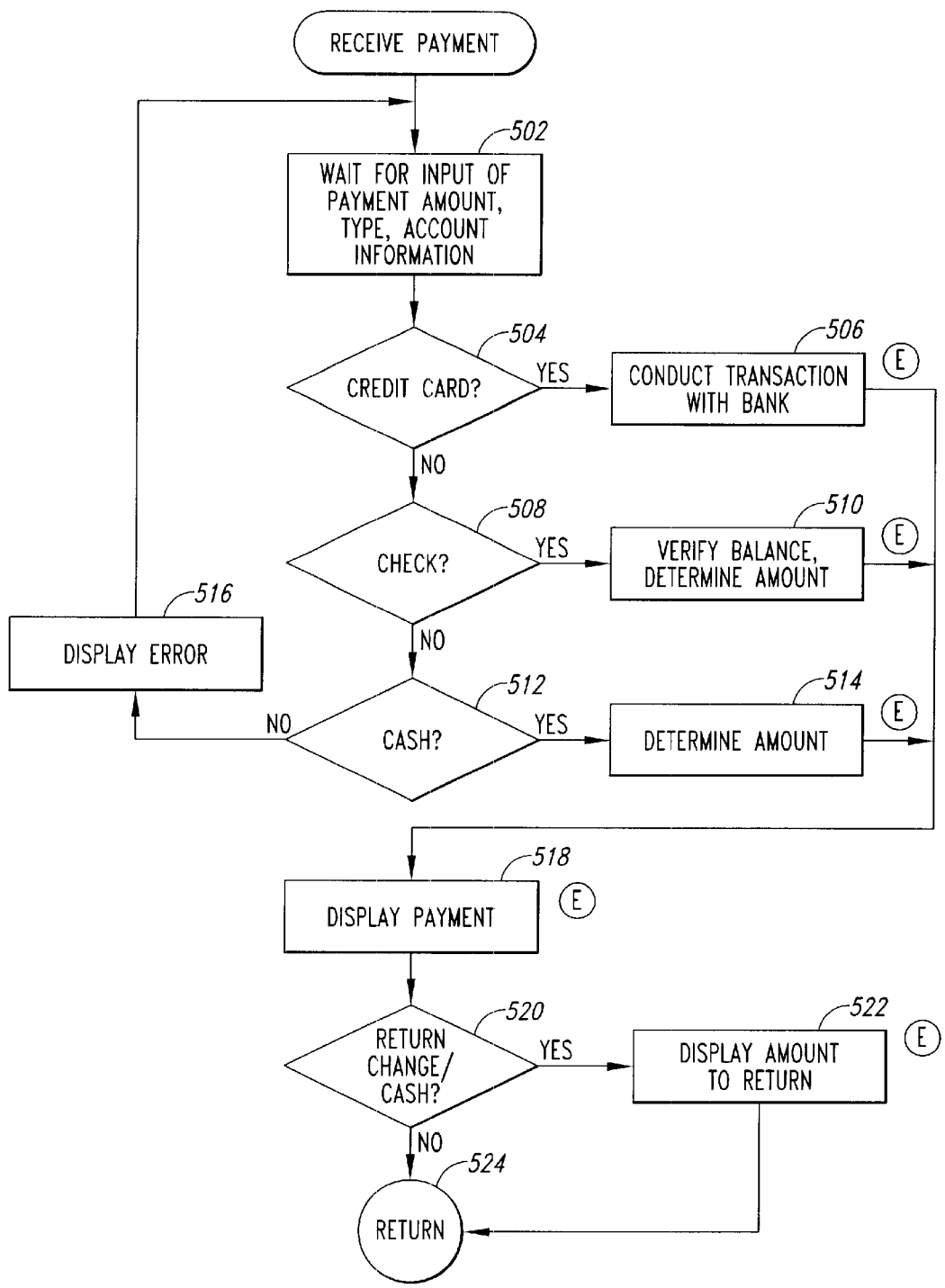
FIG. 5 is a flow control diagram for the routine "Receive Payment."

FIGS. 3–5 are flow control diagrams for a front-end application program running on the PC (102 in FIG. 1) of a front-end POS system. FIG. 3 is a highlevel flow control diagram for the program "Sales Transaction" that represents a front-end POS application program. In step 302, the program receives an identification of the customer for whom the retail transaction will be conducted. The customer identification may be scanned from a membership card or keyed in by a sales clerk according to input from a customer. The program "Sales Transaction" then, in step 304, transmits the customer identification and an indication of the start of a retail transaction to the backroom server computer (114 in FIG. 1). In step 306, Sales Transaction receives certain information from the backroom server related to the customer, including what is commonly referred to as loyalty information. This loyalty information may include such information as the number of bonus points that the customer has accrued by shopping at the retail establishment, indications of products that the customer has purchased recently in sufficient quantity to qualify for discounts or accelerated bonus points, and any other information pertaining to the customer. In step 308, Sales Transaction calls the routine "Scan Items" to process the scanning of all the items being purchased by the customer. When scanning of the items is complete, Sales Transaction, in step 310, displays a final list of items on a display monitor (104 in FIG. 1) and then, in step 312, calls the routine "Receive Payment" to process the payment by the customer for the items in the transaction. Following the payment, Sales Transaction waits, in step 314, for input from the sales clerk indicating that the transaction is complete. When the sales clerk indicates the end of the transaction, then Sales Transaction, in step 316, sends a list of the items purchased in the transaction, along with payment information, to the backroom server and prints out a sales receipt on the printing device (110 in FIG. 1) of the front-end POS system. If input other than an indication of the end of the transaction is received by Sales Transaction following step 314, Sales Transaction returns to step 308 to continue scanning items and processing the transaction.

FIG. 4 is a flow control diagram for the routine "Scan Items." In step 402, Scan Items waits for input from the scanning device or keyboard (112 and 106 in FIG. 1, respectively). When input is provided, Scan Items determines, in step 404, whether the input represents an identification of a product. If product identification has not been input, then, in step 406, Scan Items determines whether an end-of-scan indication has been input by the sales clerk. If so, Scan Items returns, in step 408. Otherwise, Scan Items returns to step 402 to wait for correct input. If a product identification was detected in step 404, Scan Items uses the product identification number, in step 406, to look up a file or database entry that describes the product. Then, using this information, Scan Items, in step 408, determines the quantity and total price for the scanned items.

There are numerous reasons that a sales clerk may have scanned an item. For instance, the customer may simply have requested that the sales clerk provide the customer with the price. Alternatively, the sales clerk may scan the item in order to delete the item from the transaction when a customer changes his or her mind after the product was initially scanned. Finally, the sales clerk may scan the product in order to add the product to the retail transaction.

Along with the product identification, the input received in step 402 additionally contains an indication of the reason for the scan. For example, the sales clerk may depress a button on the scanner (112 in FIG. 1) or input information as to the nature of the scan via the keyboard (106 in FIG. 1).

In step 410, Scan Items determines whether the scan was made to display the price to the customer. If so, then, in step 412, Scan Items displays the price and returns to step 402 to wait for further input. Otherwise, in step 414, Scan Items determines whether the scan was conducted in order to add the item to the retail transaction. If so, then in step 416, Scan Items adds the description of the item retrieved into 406 to a list of items that represents the retail transaction and updates any running totals for the retail transaction and then, in step 418, updates the display representing the retail transaction that is displayed on the display monitor (104 in FIG. 1) and then returns to step 402 to wait farther input. Otherwise, in step 420, Scan Items determines whether the scan was conducted in order to delete, or void, the item from the retail transaction. If so, then, in step 422, Scan Items deletes the description of the item retrieved in step 406 from the list of items that represents the retail transaction, updates the display in step 418, and returns to step 402 to await further input. Otherwise, Scan Items returns directly to step 402 to await for correct input.

FIG. 5 is a flow control diagram for the routine "Receive Payment." In step 502, Receive Payment waits for an indication from the sales clerk, from a card reading machine, or from some other input machine, for an indication of the amount of payment, the type of payment, and possible additional account information. In step 504, Receive Payment determines whether the customer is paying by credit card. If so, then Receive Payment, in step 506, connects a transaction with a bank or credit card service provider to transfer funds and record the retail transaction, and then proceeds to step 518, to be discussed below. Otherwise, in step 508, Receive Payment determines whether the customer is paying by check. If so, then in step 510, Receive Payment, according to information input by a check reading device or via keyboard entry by the sales clerk, verifies the customer's checking account and determines the amount of the check, and then proceeds to step 518, to be discussed below. Otherwise, in step 512, Receive Payment determines whether a customer has paid in cash. If so, then, in step 514, Receive Payment determines the amount of cash based on an indication by the sales clerk, and proceeds to step 518, to be discussed below. Otherwise, in step 516, Receive Payment displays an error and returns to step 502. In step 518, Receive Payment displays on the display monitor (104 in FIG. 1) the amount of payment made by the customer and perhaps other information concerning the payment. In step 520, Receive Payment determines whether, based on the payment received, change or cash must be returned to the customer. If so, then, in step 522, Receive Payment displays the amount of money to be returned to the customer. Finally, in step 524, Receive Payment returns.

Of course, there are many additional details that need to be handled by the front-end POS system not illustrated in FIGS. 3–5. For example, in FIG. 3, a provision may be made for a customer to change his or her mind following scanning of the items and abort the retail transaction. Thus, provision for additional types of input in the Scan Items routine or in the Sales Transaction program might be made to detect such a desire to abort the retail transaction. FIGS. 3–5 are intended to illustrate the general operation of front-end POS application programs. There are many alternative ways to implement such an application program, and many additional features that might be included. Various steps in FIGS. 3–5 are labeled with a letter "E" within a circle, such as step 302 in FIG. 3. This labeling indicates that the step represents an event that might trigger some further activity within the POS system, as will be discussed below with regard to implementation of the present invention.

Figure 6:
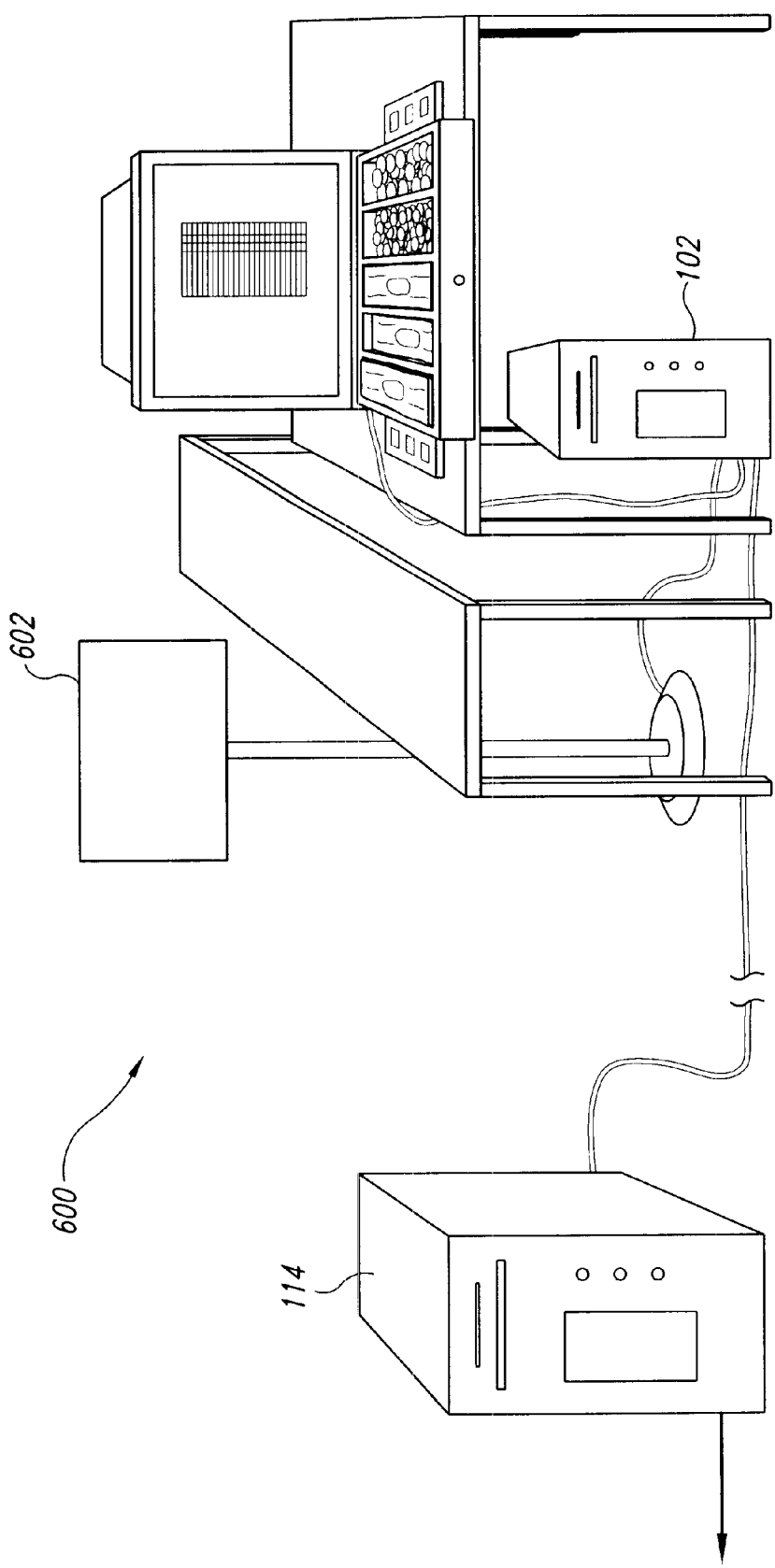
FIG. 6 displays one embodiment of the promotional retailing system.

FIG. 6 displays one embodiment of the PRS. This PRS is based on the newer-generation POS system displayed in FIG. 1. All but one component of the PRS are identical to components of the newer-generation POS system of FIG. 1 and, in the interest of brevity, will be labeled with the same labels as used in FIG. 1. The above discussion of these components will not be repeated.

The PRS 600 includes an auxiliary display device 602 that includes a visual display device and that may include audio speakers for broadcast of audio information. The PRS components of the described embodiment are written to generalized interfaces enabling any number of a variety of different display and broadcast devices to be employed. The auxiliary display and broadcast device 602 is coupled to the PC 102 and is driven by a specialized web browser, or PRS browser, running on the front-end POS system PC 102. In alternate embodiments, an additional computer system might be provided to drive the auxiliary display device 602, or the display device might be driven from the backroom server 114. The messenger and generator components may run on the PC 102, or one or both of the generators and messenger components may run on the backroom server.

The methods of the present invention can be used to augment any POS system to produce the PRS. Although the discussion will focus primarily on an embodiment of a PRS based on a newer-generation POS, traditional proprietary POS systems can also be augmented to provide real-time display and broadcast of promotional material to a customer within the context of a retail transaction. Implementation details of the messenger component and generator component may differ depending on the type of POS being augmented, as will be discussed below, but object-oriented technologies are employed to isolate and minimize such differences, where possible. Augmentation of any existing POS system to provide a PRS by the methods of the current invention does not require any proprietary, single-use hardware devices. Instead, augmentation of an existing POS system requires standard display devices, and possibly standard audio broadcast devices, and a number of software components, including the PRS messenger, the PRS generator, a web server, standard message queuing facilities and information transfer protocols.

FIGS. 7–14 illustrate the retail transaction of FIG. 2 conducted on a PRS system. FIGS. 7–14 will be discussed with references to the various events indicated in FIGS. 3–5 by labels comprising the letter "E" within a circle. FIGS. 7–14 each show the appearance of the auxiliary display monitor (602 in FIG. 6) at a given instant in time as produced by the PRS web server.

Figure 7:
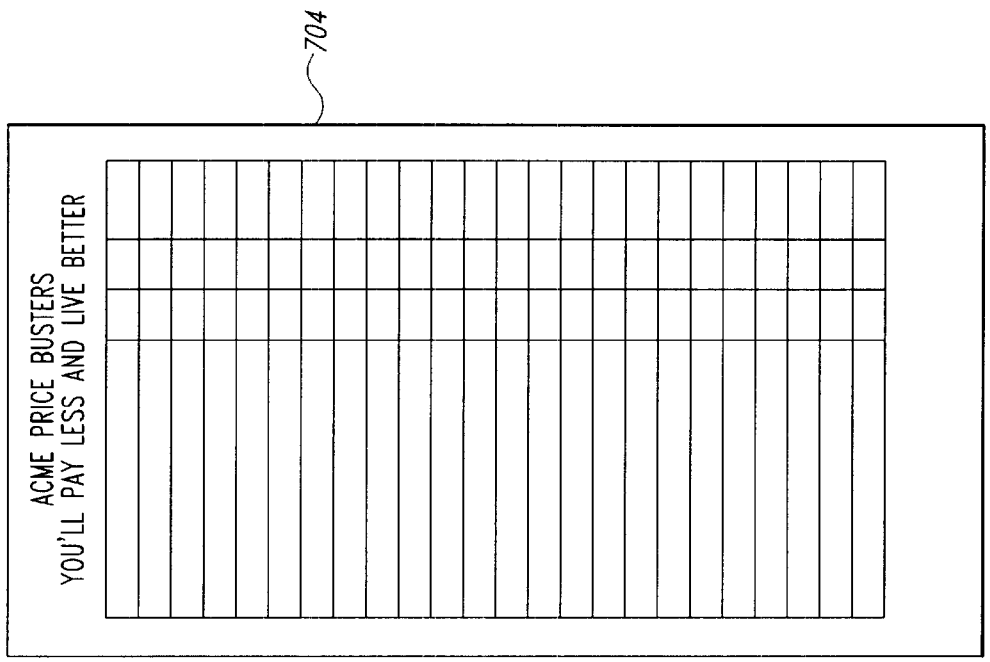
Figure 8:
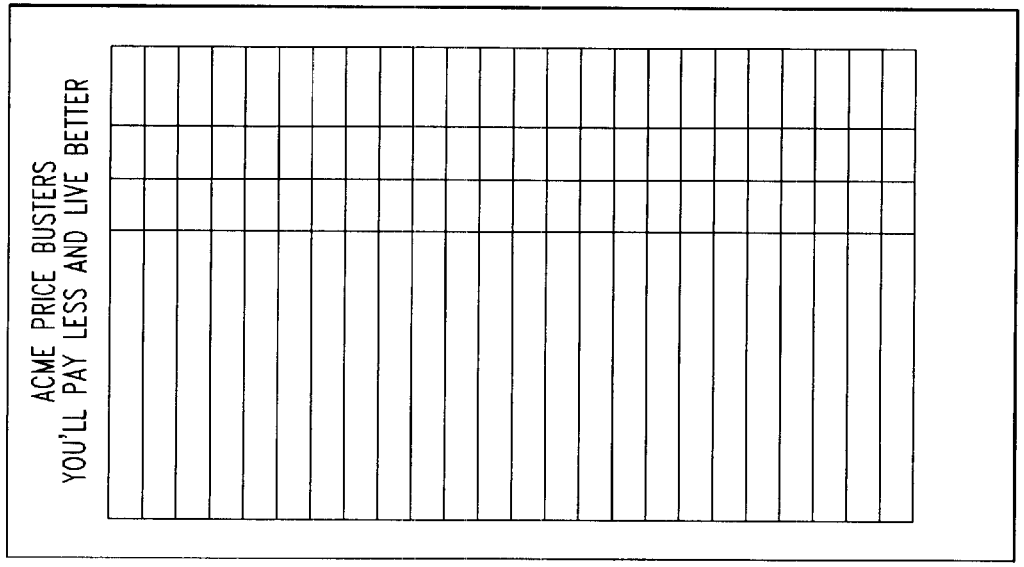

FIG. 7 illustrates the output displayed on the auxiliary display monitor during the initiation of the retail transaction. After the customer has produced a membership card or otherwise indicated the customer's identification to the sales clerk, and that customer identification has been received by the program "Sales Transaction" in step 302 of FIG. 3, Sales Transaction generates an event indicating the reception of the customer identification, and possibly the name of the customer, and passes that event to the PRS messenger. The PRS messenger queues the event which is, in turn, dequeued by the PRS generator in order to generate a hypertext markup language ("HTML") or dynamic HTML ("dHTML") file that describes the output for the auxiliary display device, illustrated in FIG. 7. Thus, if the customer name is available on the membership card, the PRS is able to generate and display a welcome message specifically tailored to the customer 702 and an initially blank item list 704. When Sales Transaction receives the loyalty information corresponding to the identified customer, in step 306 of FIG. 3, another event may be generated. In response to this event, the PRS may display information about "F" bonus points accrued by the customer and discounts on particular products, or types if of products, available to the customer based on previous purchases. The display output that results from the event generated by the reception of loyalty information as shown in FIG. 8.

Figure 9:
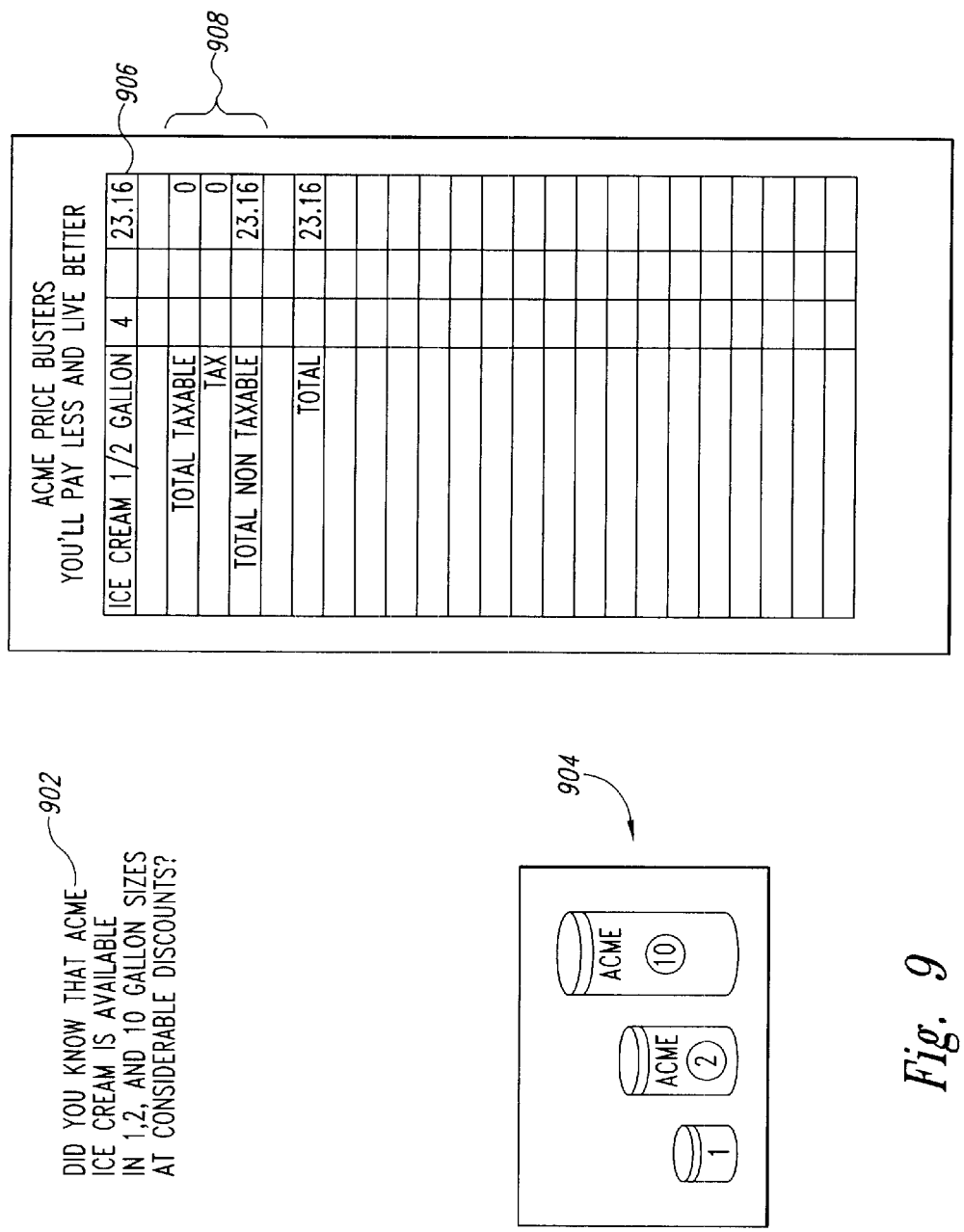

Once the retail transaction has been initiated, the sales clerk begins scanning individual products brought to the retail sales station by the customer. The scanning of the products, controlled by the routine "Scan Items" in FIG. 4, may generate a variety of different events, including events corresponding to steps 408, 412, 416 and 422 of FIG. 4. For example, the sales clerk might first scan a one-half gallon container of ice cream and then indicate, via a push button or keyboard entry, that there are 3 additional identical items being purchased by the customer. In response to input by the sales clerk and the scanning of the barcode on the side of the ice cream carton by the scanning device (110 in FIG. 1), Scan Items generates an event corresponding to step 416 of FIG. 4, in which the ice cream is added to the list of items representing the retail transaction. In response to that event, the PRS may generate certain promotional or product information based on the identity of the item and quantity added to the retail transaction. For example, the PRS may be configured to recognize the purchase of a relatively large quantity of a small size of a particular product in order to display an informational message to the customer indicating the availability of larger sizes of that product. For example, as illustrated in FIG. 9, the PRS indicates to the customer that ice cream is available in one, two and ten gallon sizes 902, as well as display an image 904 of these larger size containers. Note that any type of display object, including bit map representations of static images or representations of video clips, music, or other dynamic media can be displayed by the PRS web browser.

The event generated in step 416 of FIG. 4 corresponding to the addition of the ice cream to the list of items represented in the retail transaction also enables the PRS to add an entry for the ice cream to the display of the transaction 906 and to display running totals of taxable and nontaxable items, as well as a aggregate running total of the price of the transaction 908.

Figure 10:
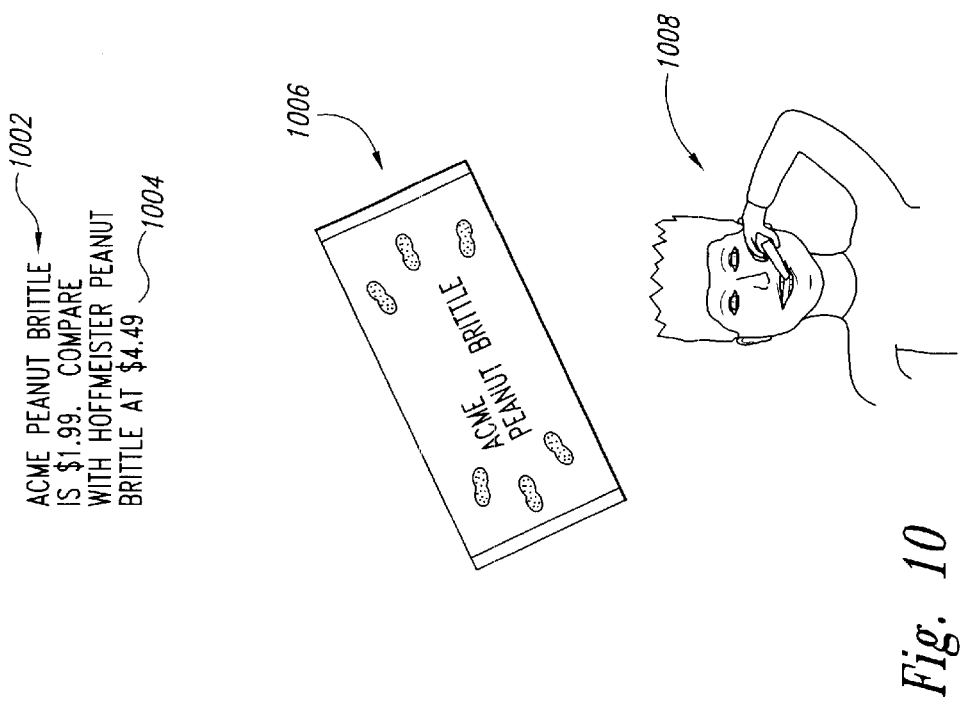

The customer may have brought an item to the sales counter in order to simply inquire about the price. When the item is scanned to display the price, an event is passed from step 412 of Scan Items to the PRS messenger, ultimately resulting in the display of price information, as shown in FIG. 10. In this case, not only the price of the item 1002 is displayed, but also additional promotional information 1004 indicating the comparative savings available by purchasing this particular item rather than a similar item of a different brand, as well as an image of the item 1006 and a short video clip 1008 showing a satisfied consumer consuming the item.

Figure 11:
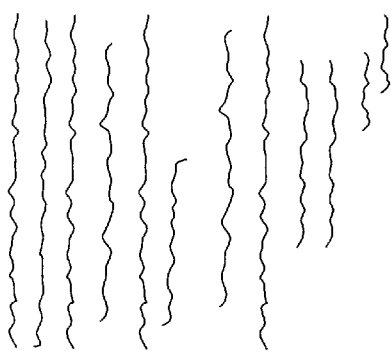

The PRS system may display informational messages, in addition to merely promotional messages. For example, in response to the addition of the next product to the retail transaction, the PRS system may generate consumer information related to that product that might be of interest to the customer, as shown in FIG. 11.

Figure 12:
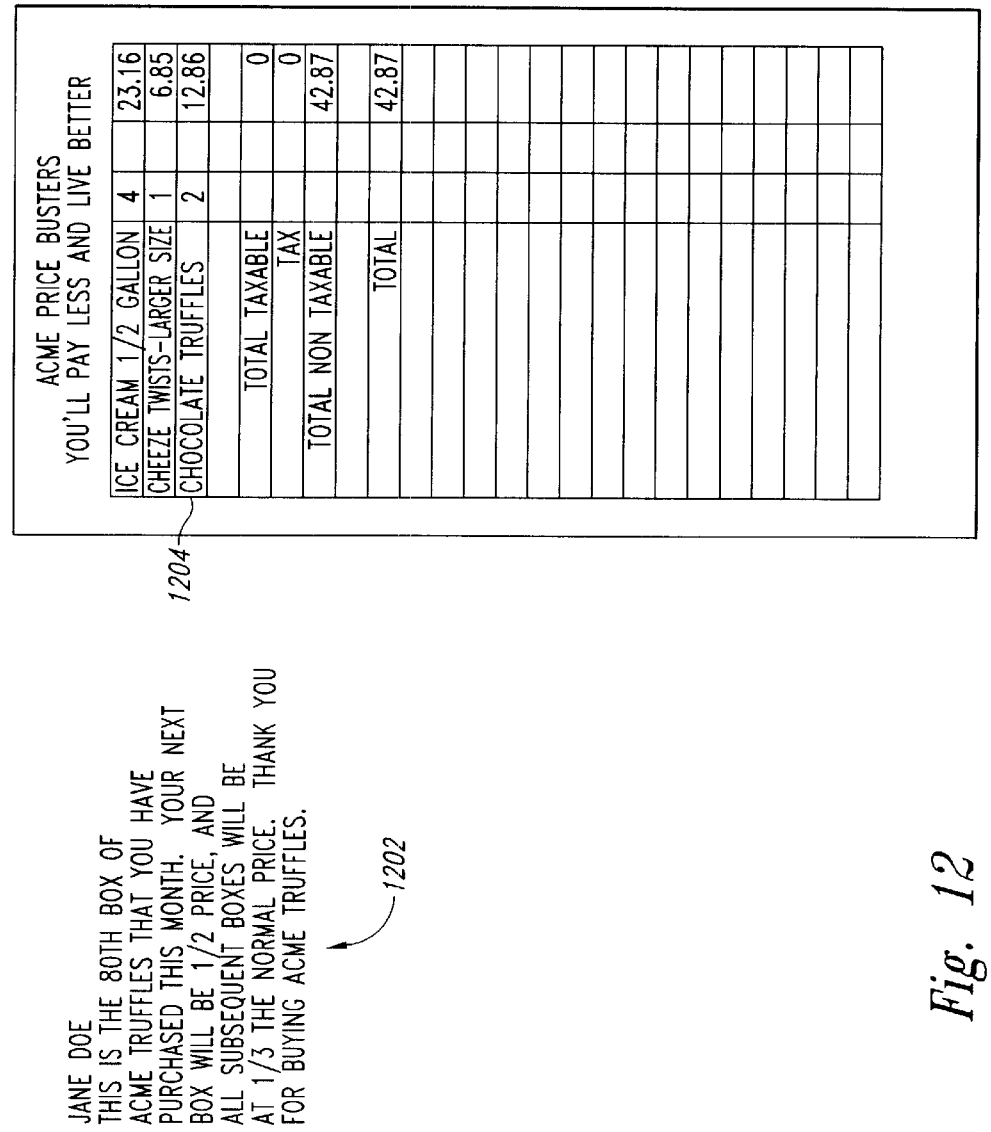

In addition to promotional and consumer information, the PRS system may also display information concerning discounts or special prices that become available to the customer upon the scanning and adding to the retail list of a particular item. For example, FIG. 12 illustrates the PRS display of discount information 1202 based on the customer's purchase of chocolate truffles 1204.

Once all of the products have been scanned, with intended display of promotional and informational information by the PRS, the sales clerk requests and receives payment for the transaction, as controlled by the routine "Receive Payment" shown in FIG. 5. This routine may also generate numerous different events. For example, the customer may pay for the purchase using a charge card. The charge card transaction, in step 506 in FIG. 5, generates an event leading to the display illustrated in FIG. 13. In this case, extra bonus points were received by the customer because the customer paid for the purchase using an ACME charge card. Both the extra bonus points 1302 and an image of an ACME charge card 1304 are displayed by the auxiliary monitor.

Finally, when the transaction is complete, as detected by Sales Transaction in step 316 in FIG. 3, the PRS may present a final display to the customer that includes promotional information, or other information, based on the entire transaction as well as the customer's previous transactions. For example, in FIG. 14, the PRS indicates the total number of bonus points accumulated by the customer 1402, the number of bonus points required by the customer to receive a prize or discount 1404, a list of the prizes for which the customer will qualify 1406, and perhaps a promotional message triggered by the types of items purchased by the customer during the retail transaction 1408.

Of course, each different POS system will employ a variety of different types of front-end POS application programs that may each generate different types of events. These events can be interpreted and translated by the PRS system to display any number of different types of information. If the customer is purchasing children's videos, for example, the PRS system might display a portion of that video on the auxiliary display monitor to entertain the customer's restless children, who might otherwise occupy themselves by grabbing items from candy and magazine displays adjacent to the sales counter. As web browser technology encompasses additional new types of presentation capabilities, the PRS web browser may, in turn, provide increased capabilities for display, including perhaps three dimensional dynamic graphical displays, surround-sound stereo, or other types of media not yet developed. Even employing those types of media currently available for display by web browsers, the PRS provides a rich medium for displaying a virtually endless number of different types of promotional and informational messages.

Figure 15:
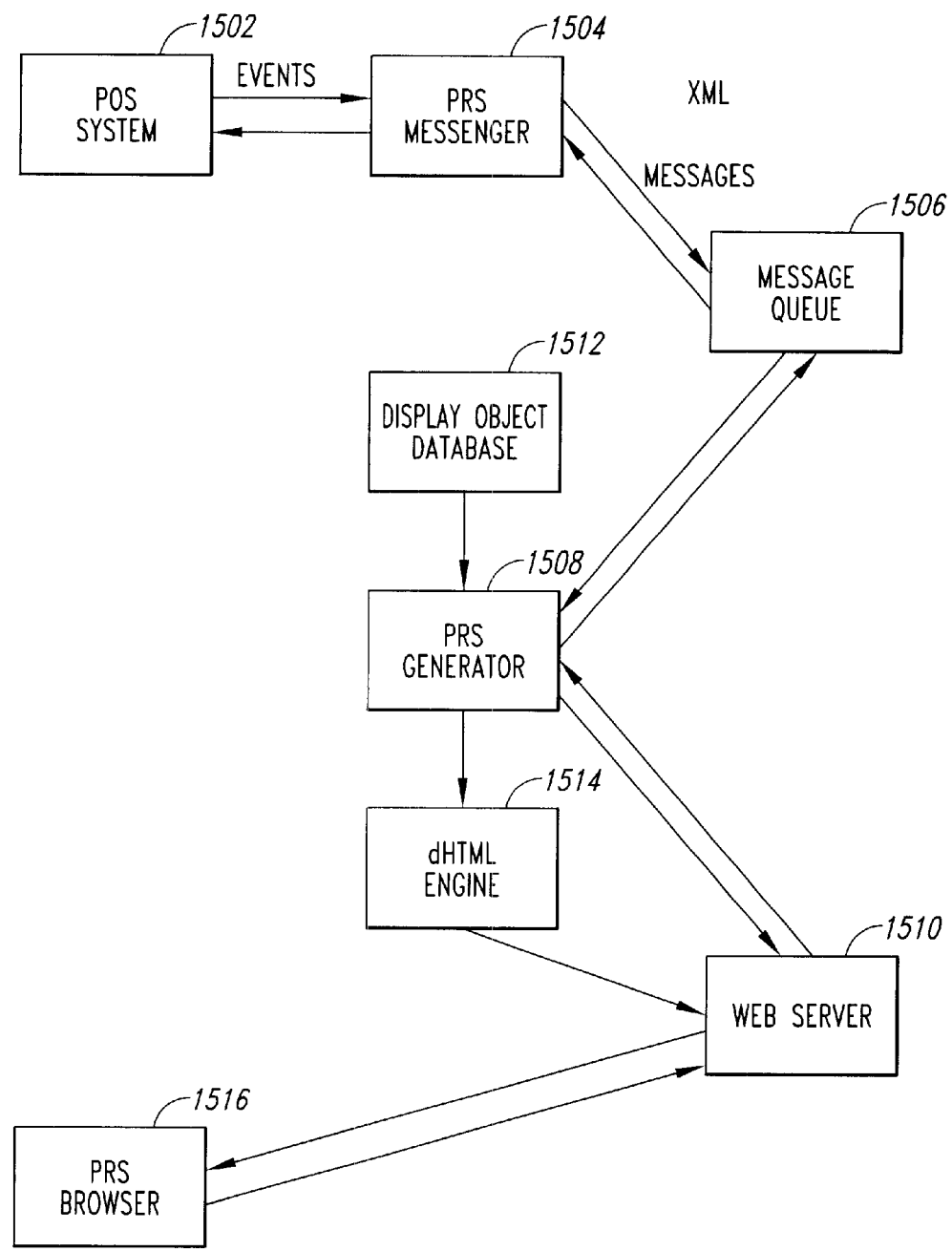
FIG. 15 is a high-level architectural block diagram of the software components, and the interactions between the software components, of the promotional retailing system.

FIG. 15 is a high-level architectural block diagram of the software components, and the interactions between the software components, that implement a PRS. The PRS includes a standard, currently-available POS system ruining a POS application program 1502. The POS system exchanges events with a PRS messenger 1504. The PRS messenger is an object, in the object-oriented programming sense of the word "object," that provides an exposed interface to the POS system for collecting events. The PRS messenger 1504 packages the events received from the POS system 1502 into messages that the PRS messenger 1504 queues to a message queue 1506. The message queue used in the PRS may be any number of different message queuing facilities provided by operating system vendors, such as IBM's MQSeries and Microsoft's MSMQ. The PRS generator 1508 dequeues messages from the message queue 1506, prepares HTML or dHTML files in response to those messages, and makes the HTML or dHTML files available to a web server 1510. The PRS generator 1508 extracts various types of display or broadcast objects from a display object database 1512 to include in dHTML files. A dHTML engine 1514 prepares the dHTML files with references to the display objects from the display object database 1512 to be included in the image represented by the file. The PRS generator thus translates each different message dequeued from the message queue 1506 into one or more web pages, defined by one or more HTML or dHTML files.

The PRS generator is controlled by high-level script programs that are prepared to handle the different types of messages generated by the POS system 1502. A number of different types of scripting languages can be employed to control the PRS generator, including Microsoft's VB Script and Sun's Java Script. The PRS generator sends indications to the web server 1510 of the HTML and dHTML files generated in response to messages so that the web server 1510 can make the web pages corresponding to the messages available to the PRS browser 1516 that displays the web pages on the auxiliary display device.

In a preferred embodiment, the messages are encapsulated in extensible r markup language ("XML") data packages. XML data packages are self-describing, so that, for example, a recipient of an XML data package can employ standard XML functionality to unpackage the contents of the XML data package into discrete values having standard data types. It is important to note that the PRS is, in this embodiment, implemented mostly from existing components, including the POS system 1502, the message queuing facility 1506, the web server 1510, and the dHTML engine 1514. The display object database 1512 may be created using a standard database management system ("DBMS"), an object-oriented database system ("OODB"), or a similar type of information storage paradigm. The scripts that control the PRS generator can be developed using any number of different integrated development environments ("IDE") or commonly available script generators. By this design and methodology, inflexible proprietary components are avoided. Using standardized, pre-existing components vastly increases the flexibility for modifying and augmenting the PRS as well as the portability of the methodologies towards different existing POS systems, and results in lower system costs.

Figure 16:
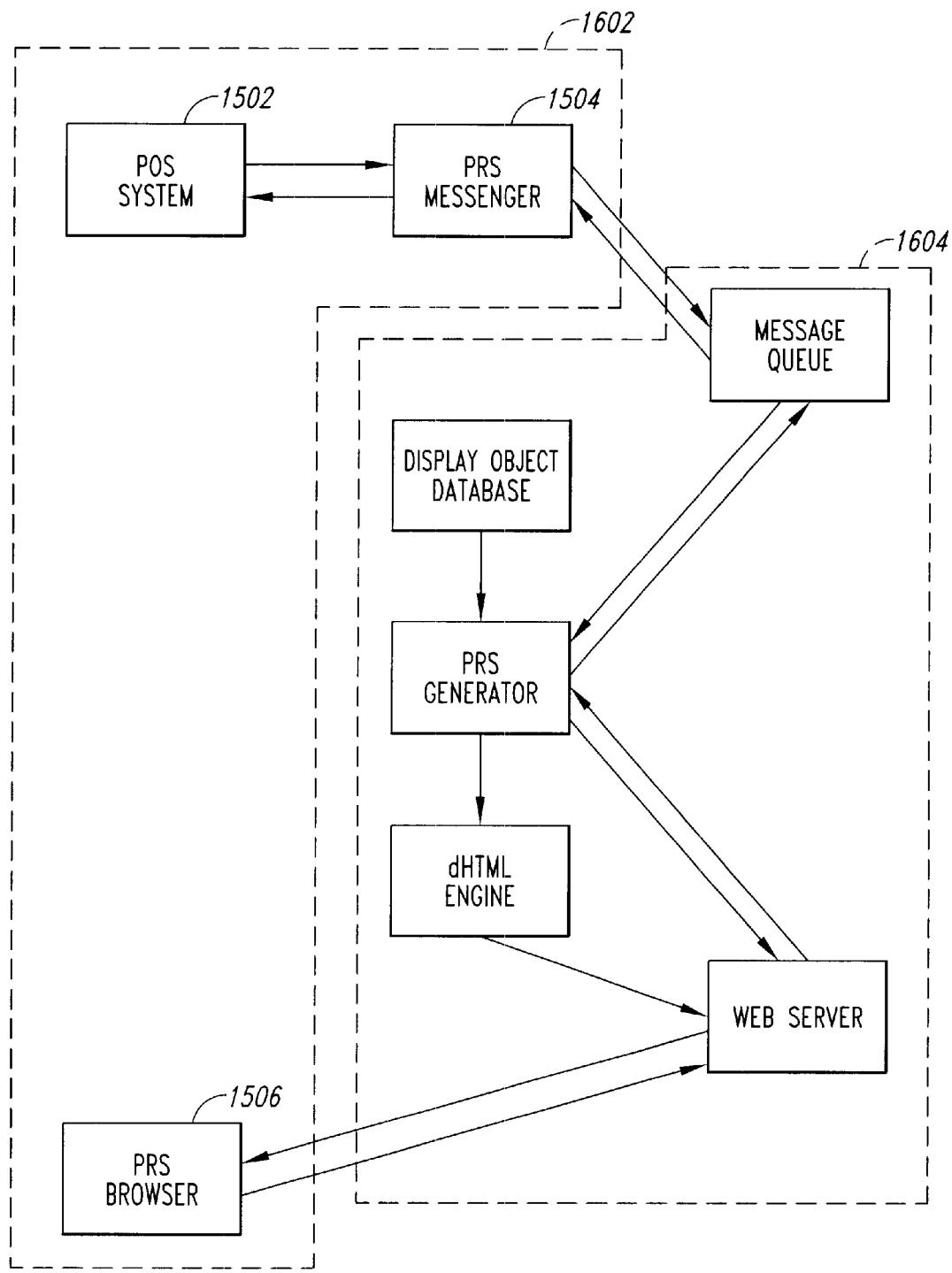
FIGS. 16–18 illustrate different possible hardware configurations on which the various components of the promotional retailing system, shown in FIG. 15, can run.
Figure 17:
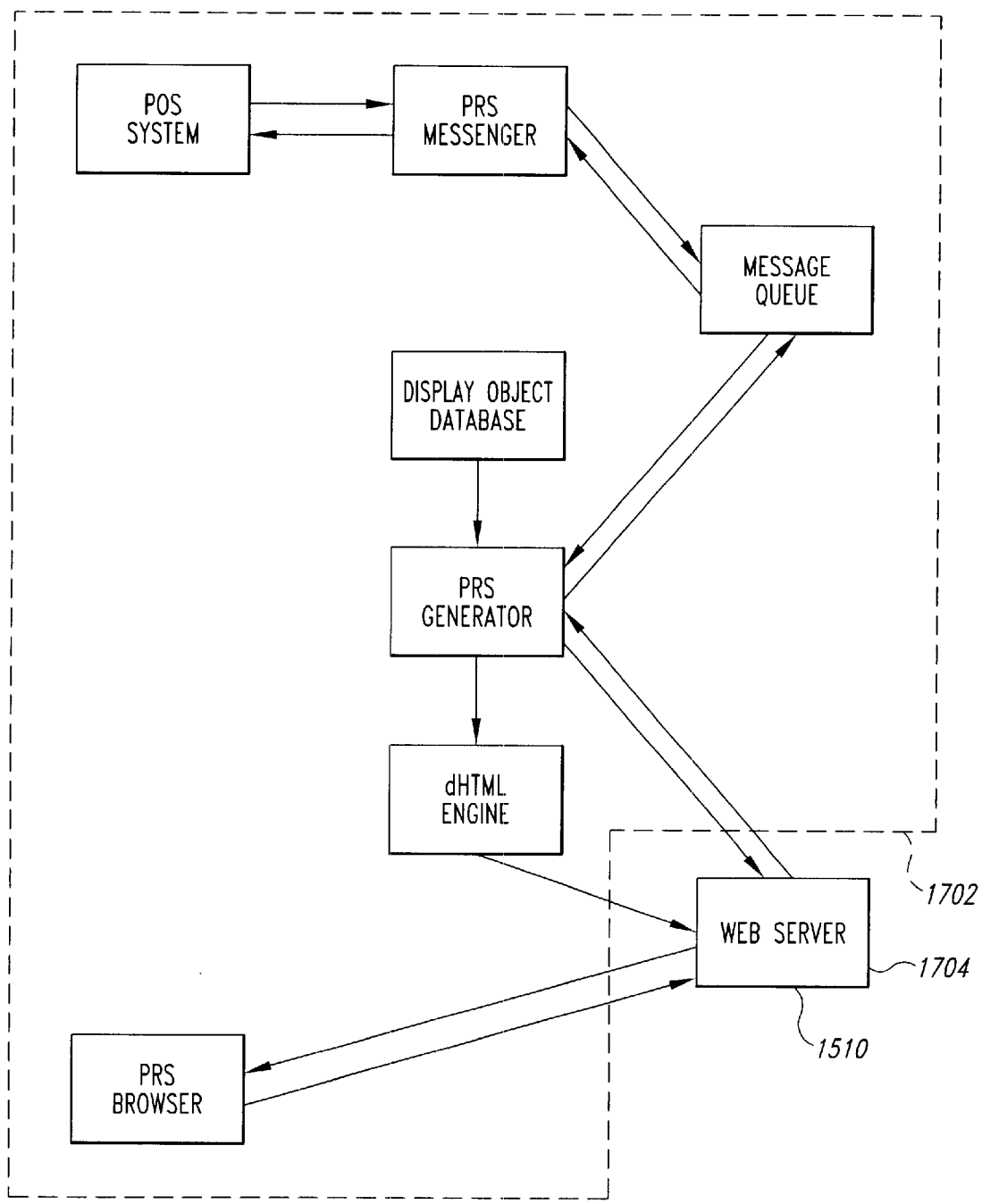
Figure 18:
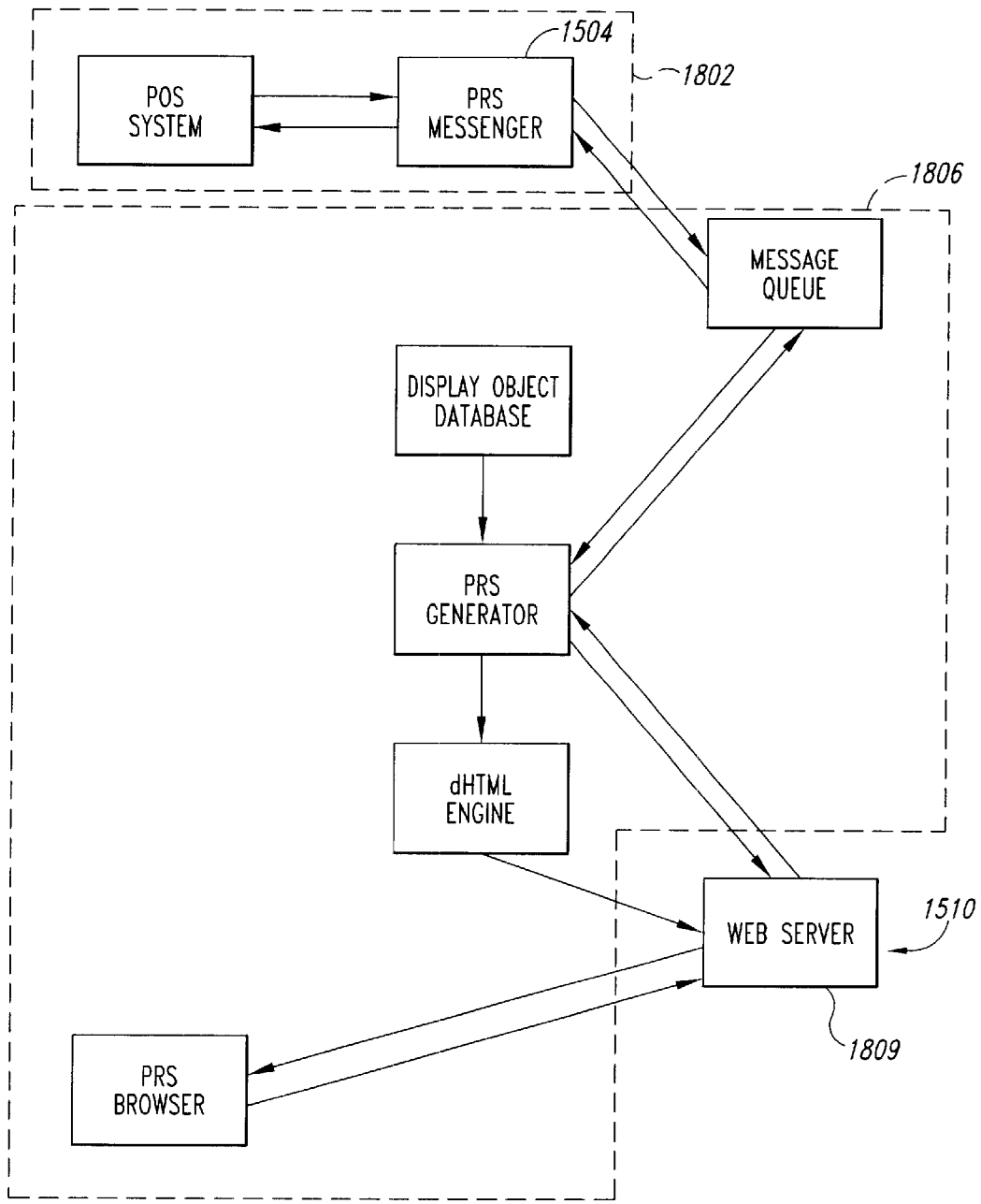

FIGS. 16–18 illustrate different possible hardware configurations on which the various components of the PRS, shown in FIG. 15, can run. For example, in FIG. 16, the POS system 1502, the PRS messenger 1504, and the PRS browser 1506 all run within the computing engine of the existing POS system 1602. The remaining components run on a backroom server 1604 interconnected with the POS computational engine 1602 via communications links or a network. By contrast, in FIG. 17, all the components of the PRS, with the exception of the web server 1510, run within the computational engine of the front-end POS system 1702 while the web server 1510 runs on the backroom server 1704. In yet another implementation, illustrated in FIG. 18, the PRS messenger 1504 runs within a computational engine of the POS system 1802, the web server 1610 runs a backroom server 1804, and the remaining components run within a third computer system 1806 added to the front-end POS system in order to operate the auxiliary display device and provide a suitable environment for the PRS generator.

It should be noted that a retailer may generate a significant amount of revenue by providing promotional displays to vendors of the products that the retailer sells. For example, the retailer may agree to display promotional information about a manufacturer's product line whenever a customer purchases one product manufactured by the manufacturer. Thus, not only can a retailer enhance a customer's shopping experience and inform the customer of opportunities and products for sale within the retail store, but also can generate direct revenues by selling advertising space to advertisers. It is important for advertisers to be able to verify that the advertisements are actually being displayed to customers. This verification can be provided in the form encrypted data transmitted to the advertiser from authenticated sources or, in other words, from known locations. Thus, for example, each time an advertisement is displayed, the PRS may generate an encrypted message including authentication information that is sent via the backroom server computer 114 in FIG. 6 directly to the advertiser's computer system.

Figure 19:
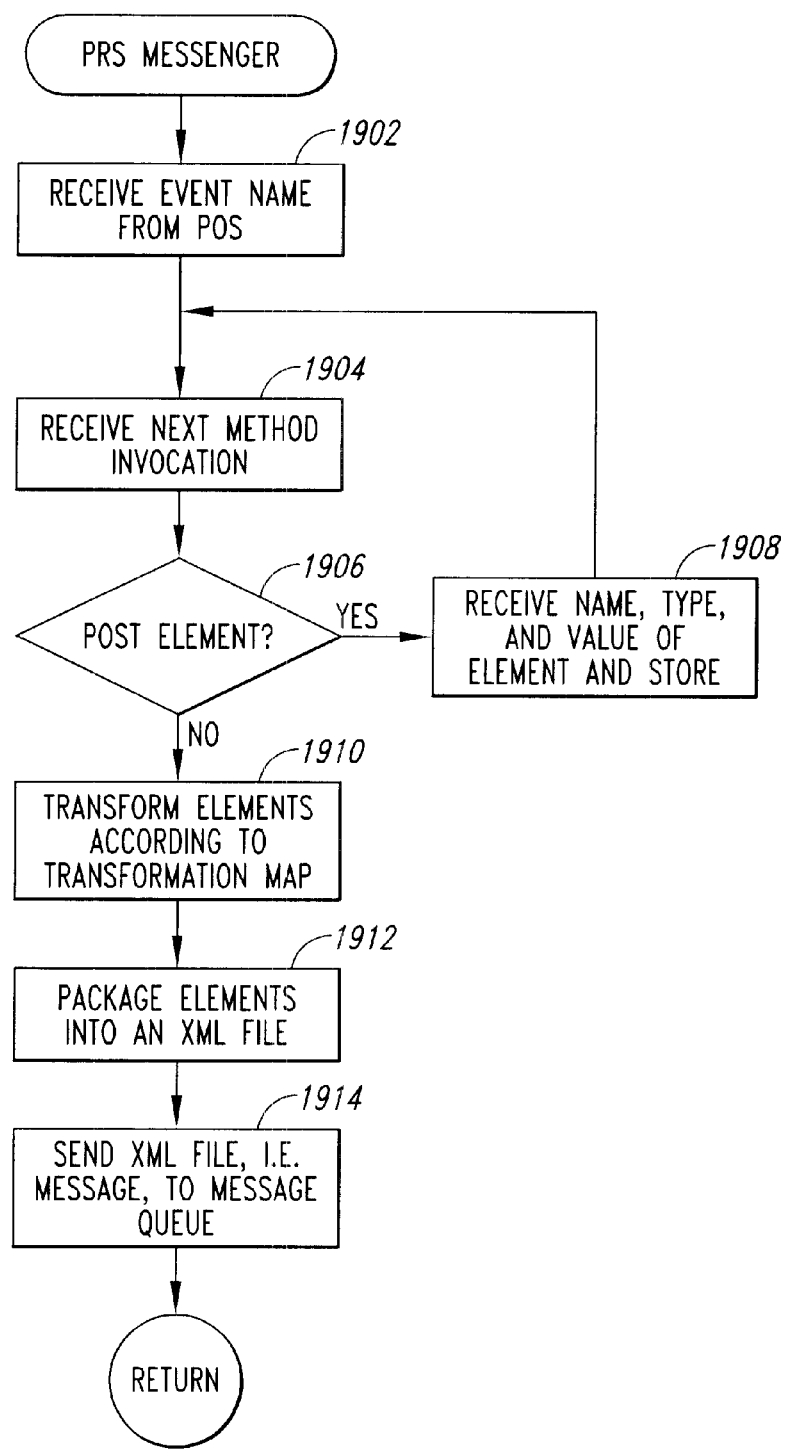
FIG. 19 is a flow control diagram describing operation of the promotional retailing system messenger.

FIG. 19 is a flow control diagram describing operation of the PRS messenger. The PRS messenger is a software routine or object-oriented programming language object that is incorporated into the existing front-end POS application program. The front-end POS application program first calls a PRS messenger routine, in step 1902, to notify the PRS messenger of the occurrence of a new event, passing the name of the event to a PRS messenger. Then, the front-end POS application program passes to the PRS messenger a number of data elements associated with the event that has occurred. The PRS messenger receives those data elements in the for loop comprising steps 1904, 1906, and 1908. First, in step 1904, the PRS messenger receives a next PRS messenger method indication. In step 1906, the PRS messenger determines whether the method indication is intended for posting of a data element associated with the event to the PRS messenger. If so, then the PRS messenger, in step 1908, receives from the front-end POS application program a name, data type, and value for the data element and stores it in memory. Control then flows back to step 1904 where the PRS messenger is placed to receive a subsequent data element. If no data element was posted in step 1906, then the PRS messenger has received an end of data element indication from the front-end application program and proceeds to process the event and data elements. In step 1910, the PRS messenger consults a transformation map to possibly transform the name of the event, or the name, data type, or value of any of the data elements associated with the event. Once any transformations have been performed, the PRS messenger packages the event name and data elements together into an XML file in step 1912. In alternative embodiments, a data encapsulation protocol other than XML can be employed. For example, in place of the XML encapsulation method and message queuing facility (1506 in FIG. 15), a remote procedure call ("RPC") facility can be employed to package and transport the event name and data element associated with the event to the PRS generator (1508 in FIG. 15). Finally, in step 1914, the XML file or, in other words, the message, produced by the PRS messenger is sent by the PRS messenger to the message queuing facility (1506 in FIG. 15).

Figure 20:
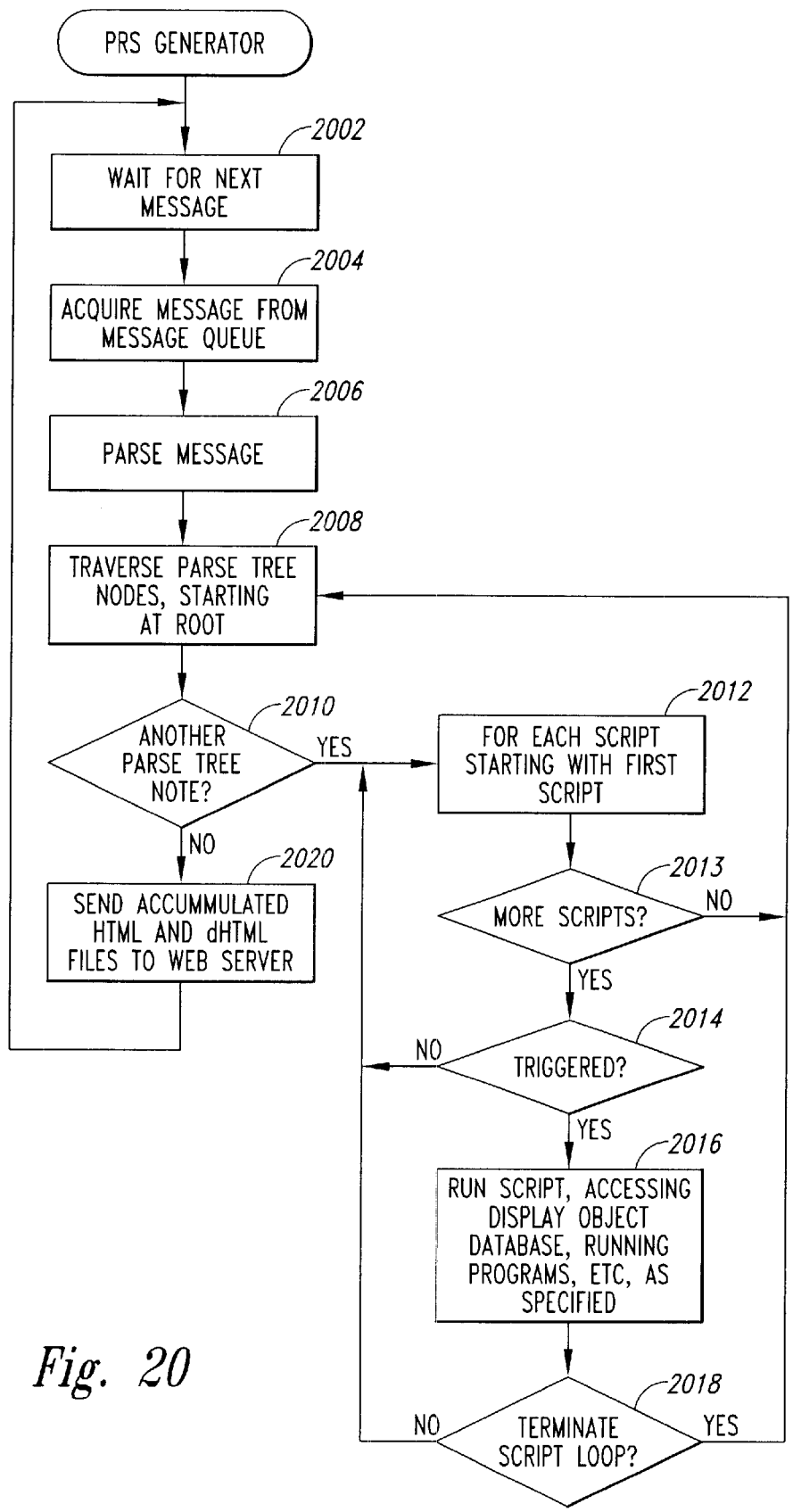
FIG. 20 is a flow control diagram of the promotional retailing system generator software component.

FIG. 20 is a flow control diagram of the PRS generator software component. The PRS generator is a process that runs on the computational engine of the front-end POS system, on a backroom server, or possibly on an additional computer within the PRS system. In step 2002, the PRS generator waits for notification of a next message available from the message queuing facility (1506 in FIG. 15). When another message has arrived, then, in step 2004, PRS generator acquires the message from the message queuing facility. In step 2006, the PRS generator parses the XML file corresponding to the retrieved message to produce a parse tree representation of the contents of the XML file. Note that such a parse tree includes data elements, the name of the event, and any other information that was associated with the event and packaged in the message by the PRS messenger. In the outer loop comprising steps 2008, 2010, 2012, 2014, 2016, and 2018, PRS generator traverses the parse tree in some predetermined order. If another parse tree node is discovered during the traversal, as determined by PRS generator in step 2010, then the inner loop comprising steps 2012, 2013, 2014, 2016, and 2018, is executed by PRS generator in order to run scripts triggered by the contents of the parse tree node. In step 2012, the PRS generator begins a for loop in which each script is considered. In step 2013, the PRS generator determines whether there are more scripts to consider in the for loop. If not, then control flows back to step 2008 where the next parse tree node is selected and considered in the outer loop. If another script should be considered, then PRS generator, in step 2014, determines whether the contents of the selected parse tree node triggers the selected script. If not, then control flows back to step 2012, where the next script is selected for consideration. Otherwise, the script triggered by the parse tree node is run. Running of the script may cause the PRS generator to access the display object database (1512 in FIG. 15), to invoke the dHTML engine (1514 in FIG. 15), to run other programs, to communicate with a remote computer via a WAN or network, and do any other types of operations necessary to prepare one or more HTML or dHTML files that describe the promotional informational display that would be displayed to a customer in response to the occurrence of an event in the POS system that elicited the message currently being processed by the PRS generator. In step 2018, the PRS generator determines whether the script has indicated that no further scripts be considered. If so, control flows back to step 2008 where the next parse tree node is selected. Otherwise, flow controls back to step 2012 where the next script will be selected and considered by the PRS generator. When the nodes of the parse tree have all been traversed, the PRS generator in step 2020 sends all the HTML and dHTML files that have been prepared via running of the script for the currently processed message to the web server (1510 in FIG. 15). The web server then interacts with the PRS browser (1516 in FIG. 15) to display a promotional informational message to the customer.

FIGS. 21A–21B illustrate an example script run by the PRS generator. A script may include various tags, such as the tag "BANNER" 2102, references to other scripts such as the reference to "Transaction Presentation Banner" 2104, references to display objects, such as "http:/www.server.com/freeprnt.swf" 2106, and references to programs, such as the program designated by the string "http://www.server.com/dSIGN" 2108. Each tag, such as tag 2102, is followed with a balancing end tag, such as the end tag "/BANNER" 2110. The tags introduce sections of a script that correspond to various different aspects of a promotional or informational message, criteria for invoking the script, and various PRS constructs that represent complex interactions between various PRS components. For example, the tag "SCRIPT" 2112 contains conditional logic that specifies that when a XML message contains a universal price code ("UPC") equal to the number 1234567890, the script should be triggered for execution by the PRS generator to carry out the actions specified within the script. One such action, for example, is to display a banner within the banner region on the display monitor that is specified in the script "Transaction Presentation Banner," as specified in the line introduced by the "BANNER" tag 2102.

The various PRS components can be implemented in many different types of languages for execution on a variety of different kinds of hardware platforms. A number of different types of scripting languages can be devised to specify the construction of promotional and informational messages to be displayed to a customer. For example, common JAVA script parsers may be employed. A large variety of different capabilities can be offered by the script language. For example, inclusion of any number of different types of display and broadcast objects, including dynamic multimedia objects, such as video clips, or audio wave files. Different web browsers, web servers, and internal communication mechanisms might be used.

Although the above described embodiment, as illustrated in FIG. 15 was described in terms of events being generated on the POS system 1502, passed to the PRS messenger 1504, translated by the PRS messenger 1504 into XML messages that are passed to the PRS generator 1508 to specify creation of HTML files describing promotional informational displays to be displayed to a customer via the PRS browser 1516, it should be noted that the arrows in FIG. 15 are by-directional. If the display monitor on which the promotional and informational messages are displayed incorporates a touch-screen capability, then touch-screen events may be transmitted from the PRS browser 1516 in a reverse direction back to the POS system 1502. This would allow, for example, a customer to select options from a display menu to affect subsequent events within a retail transaction.

The embodiment described above is tailored to use within retailing systems in order to facilitate retail transactions. Such systems may include traditional checkout counter systems, as described above, or various other retailing systems, including electronic commerce systems. However, the methodologies of the current invention can be employed in a variety of other systems and settings. For example, these methodologies can be used to augment current kiosk systems to produce more elaborate real-time display of information to a user. In fact, these methodologies could be employed in almost any system in which information is presented to a person run automated system. Examples include computerized systems for displaying control information, such as modern avionics systems, machinery control systems, monitoring systems, and other complex computer-controlled digital display systems.

It is intended that the scope of the invention be defined by the following claims and their equivalents:

What is claimed is:

1. A method for augmenting a point of sale system to provide multi-media promotional and informational displays to a customer during a retail transaction that are based on the context of the retail transaction, the method comprising:

augmenting a front-end point of sale system to include a multi-media display device for displaying promotional and informational displays to the customer;

including a messenger component within the front-end point of sale system to receive real-time notification of events detected by the front-end point of sale system during the course of a retail transaction, translate the events into messages, and make the messages available for processing by other components the point of sale system passing said events to the messenger component by passing the name of said events and data elements associated with said events and the messenger component transforming said events name and data elements according to a transformation map and packaging the transformed said events name and data elements into a self-describing data encapsulation object, including a generator component within the point of sale system to process messages made available by the messenger component to produce descriptions of visual displays corresponding to the promotional and informational displays;

including a display component within the point of sale system that receives the descriptions of visual displays produced by the generator component and displays to the customer the corresponding promotional and informational displays on the multi-media display device; and during the course of the retail transaction, receiving notifications of events detected by the front-end point of sale system;

translating the events into messages;

producing descriptions of visual displays corresponding to the messages; and displaying promotional and informational multi-media displays to the customer on the multi-media display device according to the descriptions of visual displays corresponding to messages representing the translation of events detected by the front-end point of sale system.

2. The method of claim 1 further including parsing messages by the generator component and running scripts by the generator component that specify production of the descriptions of visual displays.

3. The method of claim 1 wherein the messenger component makes messages available to the generator component by passing the messages to a message queuing facility and wherein the generator component receives messages from the message queuing facility.

4. The method of claim 1 wherein the display component includes a web server and a web browser, and wherein the descriptions of visual displays are hypertext markup language documents or dynamic hypertext markup language documents.

5. The method of claim 1 wherein the promotional and informational messages may include various types of multimedia presentation objects, including video clips, still images, spoken text, printed text, and music.

6. An enhanced point of sale system that provides multimedia promotional and informational displays to a customer during a retail transaction that are based on the context of the retail transaction, the system including:

a front-end point of sale system that includes a multi-media display device for displaying promotional and informational displays to the customer;

a messenger component within the front-end point of sale system to receive real-time notification of events detected by the front-end point of sale system during the course of a retail transaction, translate the events into messages, and make the messages available for processing by other components the point of sale system passing said events to the messenger component by passing the name of said events and data elements associated with said events and the messenger component transforming said events name and data elements according to a transformation map and packaging the transformed said events name and data elements into a self-describing data encapsulation object, a generator component within the point of sale system to process messages made available by the messenger component to produce descriptions of visual displays corresponding to the promotional and informational displays; and a display component within the point of sale system that receives the descriptions of visual displays produced by the generator component and displays to the customer the corresponding promotional and informational displays on the multi-media display device.

7. The system of claim 6 wherein the messenger component passes messages to the generator component via a message queuing facility.

8. The system of claim 7 wherein the generator component executes scripts that are triggered by data values included in the messages, the scripts specifying various operations and tasks required to prepare the descriptions of visual displays, including running programs, accessing databases containing display objects to be included in the visual displays, invoking dynamic hypertext markup language engines for preparing dynamic hypertext markup language files, and invoking other scripts.

9. The system of claim 7 wherein the display component includes a web server and a web browser for display of hypertext markup language files and dynamic hypertext markup language files.

10. The system of claim 7 wherein the display component includes a touch screen for receiving customer responses and indications and wherein the customer responses and indications are passed from the display component back to the generator component which then passes messages containing the responses and indications back to the messenger component, the messenger component then generating events corresponding to the responses and indications and passing those events to the front-end point of sale system.

11. The system of claim 7 wherein the generator component tracks the display of different visual displays and reports the number of times certain visual displays are displayed via a network or telecommunications link to a remote computer.

* * * * *